US010303486B2

(12) United States Patent
Ravichandran et al.

(10) Patent No.: US 10,303,486 B2
(45) Date of Patent: May 28, 2019

(54) CAPTURING PRE-FETCH BLOCKS OF AN OPERATING SYSTEM TO IMPROVE BOOT PERFORMANCE IN A CLOUD ENVIRONMENT

(71) Applicant: Microsoft Technology Licensing, LLC, Redmond, WA (US)

(72) Inventors: Chandramouleswaran Ravichandran, Redmond, WA (US); Sushant Pramod Rewaskar, Redmond, WA (US); Murtaza Muidul Huda Chowdhury, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 15/591,943

(22) Filed: May 10, 2017

(65) Prior Publication Data

US 2018/0253316 A1    Sep. 6, 2018

Related U.S. Application Data

(60) Provisional application No. 62/466,695, filed on Mar. 3, 2017.

(51) Int. Cl.
*G06F 9/00* (2006.01)
*G06F 15/177* (2006.01)
*G06F 9/4401* (2018.01)

(52) U.S. Cl.
CPC .................................. *G06F 9/4406* (2013.01)

(58) Field of Classification Search
None
See application file for complete search history.

(56) References Cited

U.S. PATENT DOCUMENTS

| 6,810,478 | B1 | 10/2004 | Anand et al. |
| 8,966,121 | B2 | 2/2015 | Josefsberg et al. |
| 9,071,587 | B2 | 6/2015 | Heninger et al. |
| 9,454,384 | B2 | 9/2016 | Winter et al. |

(Continued)

OTHER PUBLICATIONS

Wheeler, et al., "Guide to create a virtual machine image for the Azure Marketplace", https://docs.microsoft.com/en-us/azure/marketplace-publishing/marketplace-publishing-vm-image-creation, Published on: Jan. 5, 2017, 46 pages.

(Continued)

*Primary Examiner* — Nitin C Patel
(74) *Attorney, Agent, or Firm* — Fiala & Weaver P.L.L.C.

(57) ABSTRACT

Techniques are described for improving the boot performance of an operating system (OS) used to launch a virtual machine. In embodiments, a request is received that identifies an OS image and that includes information indicative of when a boot-up process of the OS is complete. A boot-up process of the OS is then performed until complete, as indicated by the information, which includes loading a portion of the OS image from a virtual hard drive. During performance of the process, data is obtained that identifies logical units in the virtual hard drive that are accessed to obtain the portion of the OS image. A copy of the virtual hard drive that include the OS image and the data is then stored so that it can be used to facilitate launching a virtual machine through selective pre-fetching of only the identified logical units from the copy of the virtual hard drive.

20 Claims, 8 Drawing Sheets

(56) References Cited

U.S. PATENT DOCUMENTS

| | | | |
|---|---|---|---|
| 2009/0049295 A1 | 2/2009 | Erickson et al. | |
| 2011/0191834 A1* | 8/2011 | Singh | G06F 17/00 |
| | | | 726/6 |
| 2011/0264776 A1 | 10/2011 | Clerc et al. | |
| 2013/0290694 A1* | 10/2013 | Civilini | H04L 41/0806 |
| | | | 713/2 |
| 2016/0012071 A1* | 1/2016 | Herman | G06F 17/30088 |
| | | | 707/649 |
| 2018/0018183 A1* | 1/2018 | Burger | G06F 9/4406 |

OTHER PUBLICATIONS

"How to Deploy Operating System Images to a Computer", https://technet.microsoft.com/en-in/library/bb632559.aspx, Retrieved on: Feb. 23, 2017, 2 pages.

"Creating Discover Images", https://technet.microsoft.com/en-us/library/dd637996(v=ws.10).aspx, Published on: Jun. 7, 2016, 4 pages.

"Centralized Disk OS Imaging", https://www.manageengine.com/products/desktop-central/os-image-capturing.html, Published on: Nov. 9, 2009, 3 pages.

Hornbeck, J. C., "OSD: How to add a script to a ConfigMgr 2007 Boot Image", https://blogs.technet.microsoft.com/configurationmgr/2010/10/21/osd-how-to-add-a-script-to-a-configmgr-2007-boot-image/, Published on: Oct. 21, 2010, 9 pages.

* cited by examiner

CAPTURING PRE-FETCH BLOCKS OF AN OPERATING SYSTEM TO IMPROVE BOOT PERFORMANCE IN A CLOUD ENVIRONMENT

CROSS-REFERENCE TO RELATED APPLICATIONS

This application claims priority to U.S. Provisional Patent Application No. 62/466,695, filed Mar. 3, 2017 and entitled "Capture Pre-fetch Blocks of an Operating System to Improve Boot Performance in Cloud Environment," the entirety of which is incorporated by reference herein.

BACKGROUND

Customers of cloud services (e.g., Microsoft® Azure®, Amazon Web Sevices®, Google Cloud Platform™) deploy thousands of virtual machines of varying size, operating systems and specifications every day. When data (e.g., an operating system image) must be loaded from remote storage to a host computer at the time of launching a virtual machine on the host computer, the time to boot/provision the virtual machine will be delayed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for improving the boot performance of any operating system (OS), whether standard or customized, that is used to launch a virtual machine, wherein the virtual machine is launched from an image of the OS that is stored remotely from the host computer upon which the VM is executed. In accordance with embodiments, a request is received via an interface, where the request identifies an image of an OS and includes information indicative of when a boot up process of the OS is complete. An optimization process is performed in response to at least receiving the request. In an embodiment, the optimization process includes performing a boot-up process of the OS until complete, as indicated by the information, wherein performing the boot-up process of the OS includes loading a portion of the image of the OS from a virtual hard drive. During performance of the boot-up process of the OS, data is obtained that identifies logical units in the virtual hard drive that are accessed to obtain the portion of the image of the OS. A copy of the virtual hard drive that includes the image of the OS and the data is then stored, the image of the OS and the data being usable to facilitate launching a virtual machine through selective pre-fetching of only the identified logical units from the copy of the virtual hard drive.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
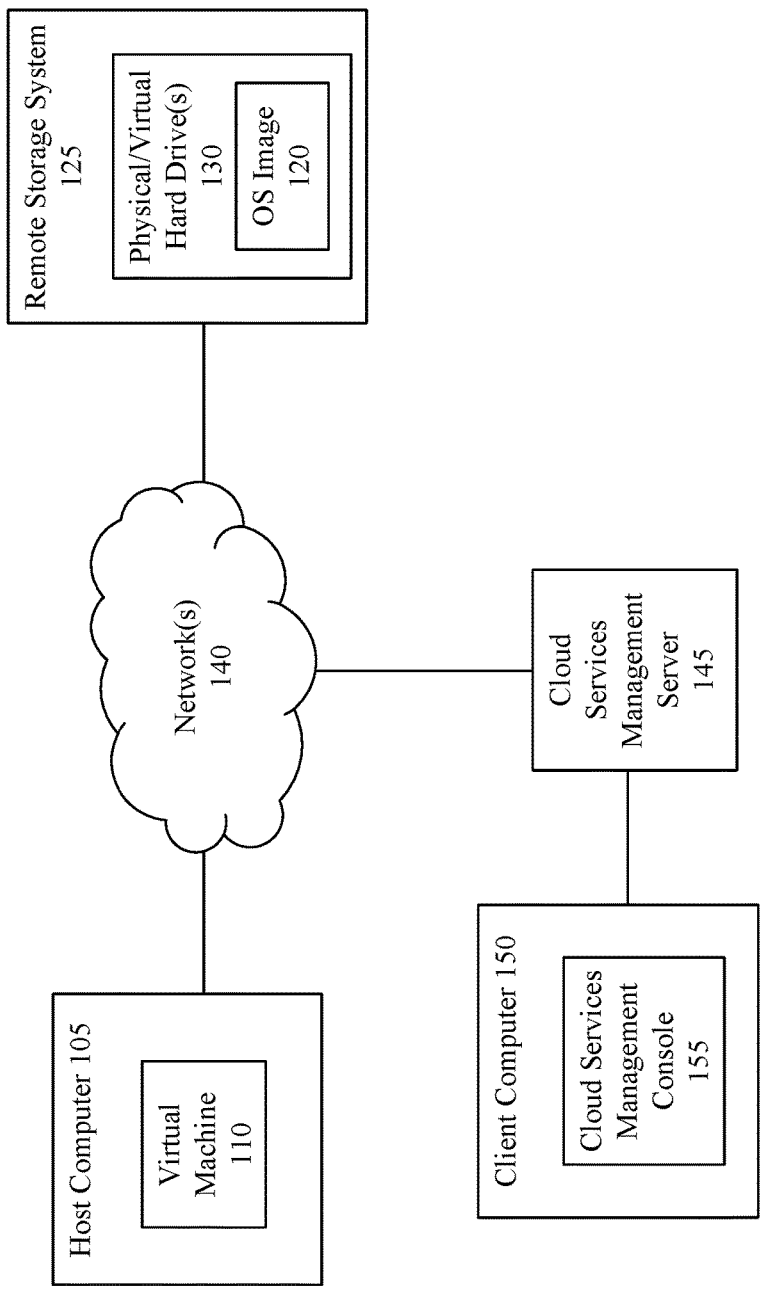
FIG. 1 is a block diagram of an example system for booting up an operating system (OS) of a virtual machine on a host computer in a cloud environment in which an image of the OS is stored remotely from the host computer.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Example embodiments described herein are directed to techniques for improving the boot performance of a virtual machine that is launched from an operating system (OS) image. In some conventional implementations, the OS image may be stored locally with respect to the host machine on which the virtual machine is to be launched (e.g., on a hard drive or other memory of the host machine). When the OS image is stored locally with respect to the host computer, the OS image may be accessed relatively quickly and thus the virtual machine can thus be launched relatively quickly. However, if the host computer and/or the local storage device fails, then the OS image, which may have been modified after the virtual machine was launched, cannot then be used to boot up a replacement virtual machine because the modified OS image will have been lost.

To address this issue, the OS image that is used to boot the virtual machine may be stored in a storage system that is remote with respect to the host computer (e.g., in a storage system that must be accessed by the host computer over one or more networks). The remotely-stored OS image may be transferred to the host computer at the time the virtual machine is launched and any modifications made to the OS image after launch may be written back to the remotely-stored OS image. In accordance with such an implementation, the failure of the host computer will not impact the modified OS image, and thus the modified OS image can be used to launch a replacement virtual machine if needed. Accordingly, such an implementation provides increased resilience as well as persistence of the OS image. In further implementations, multiple copies of the OS image may be maintained remotely, thereby providing even higher resilience and persistence.

To help illustrate the foregoing, FIG. 1 will now be described. In particular, FIG. 1 is a block diagram of an example system 100 for booting up an OS of a virtual machine on a host computer in a cloud environment in which an image of the OS is stored remotely from the host computer. As shown in FIG. 1, system 100 includes a host computer 105 that is connected to a remote storage system 125 via one or more networks 140. A cloud services management server 145 is also connected to network 140, and a client computer 150 is connected to cloud services management server 145 (e.g., via network(s) 140 or some other connection). Client computer 150 is configured to present a cloud services management console 155 (e.g., an interface, such as a user interface) that enables a user thereof to interact with cloud service management server 145 to configure, initiate, or otherwise manage one or more cloud services. For the purposes of this example, a user may interact with cloud services management server 145 to launch one or more virtual machines on or more host computers. For example, a user may interact with cloud services management server 145 to cause a virtual machine 110 be launched on host computer 105.

In further accordance with this example, host computer 105 boots virtual machine 110 by fetching OS image 120 from one or more physical or virtual hard drives 130 included within remote storage system 125 via network(s) 140. OS image 120 is received by host computer 105 and used thereby to boot virtual machine 110. Furthermore, host computer 105 is configured to transfer any writes made to OS image 120 back to remote storage system 125. As noted above, in accordance with such an implementation, a failure of host computer 105 will not impact modified OS image 120, and thus modified OS image 120 can be used to launch a replacement virtual machine if needed.

While the above-described method for launching virtual machine 110 from remotely-stored OS image 120 increases resilience and persistence as noted above, this approach increases the amount of time it takes to launch virtual machine 110 as compared to an implementation in which the OS image is stored locally by host computer 105. For example, it has been observed that in some implementations it may take 2 to 3 times longer to boot from a remotely-stored OS image than from a locally-stored one. This is because host computer 105 must wait until the entirety of OS image 120 is fetched from physical or virtual hard drive(s) 130 prior to launching virtual machine 110.

One possible technique for addressing this issue involves copying the OS image into local storage of the host computer prior to initiating the launch of the virtual machine, so that the booting of the virtual machine will be faster. This approach may be termed "pre-fetching," since a copy of the OS image is fetched into local storage of the host computer before booting the virtual machine. This approach will now be described in reference to FIG. 2.

Figure 2:
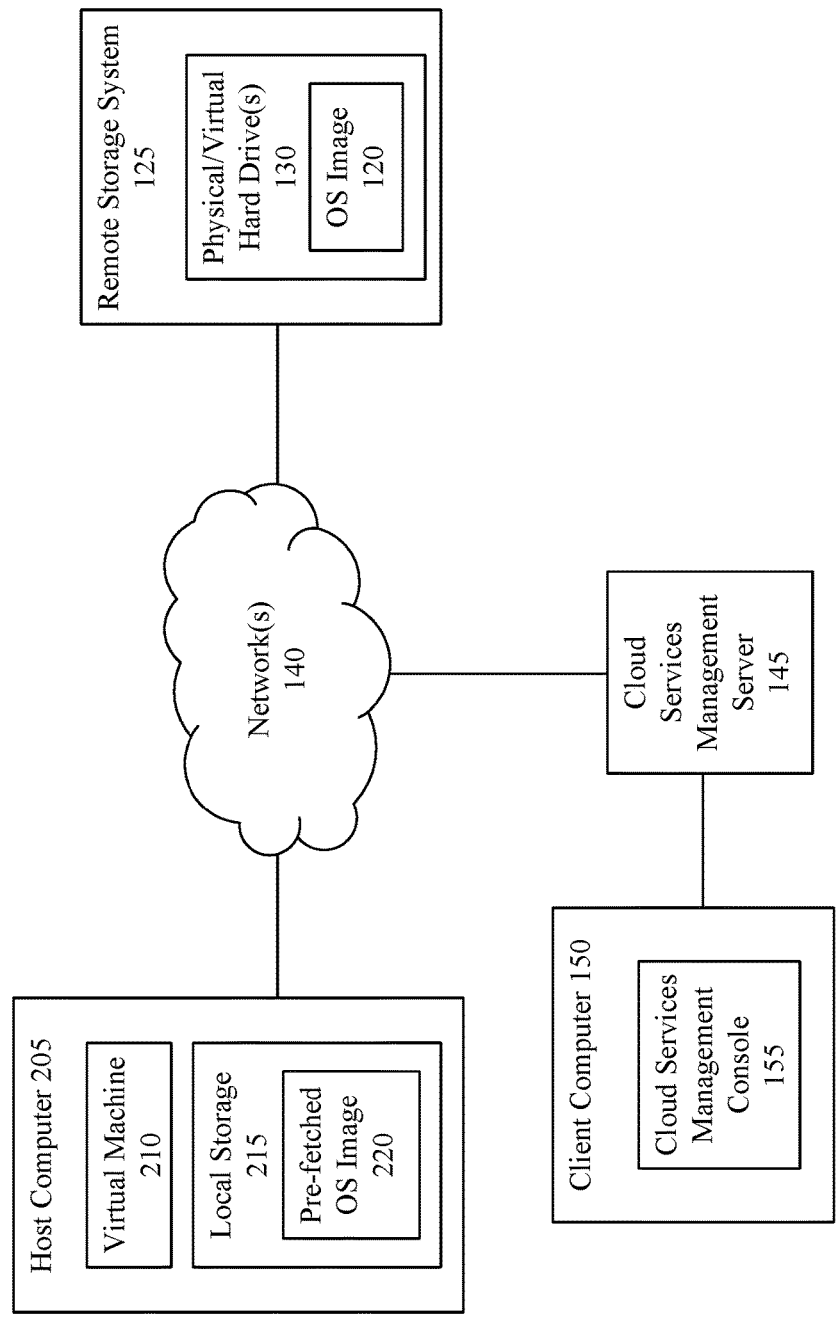
FIG. 2 is a block diagram of another example system for booting up an OS of a virtual machine on a host computer in a cloud environment in which an image of the OS is stored remotely from the host computer.

In particular, FIG. 2 is a block diagram of another example system 200 for booting up an OS of a virtual machine on a host computer in a cloud environment in which an image of the OS is stored remotely from the host computer. As shown in FIG. 2, system 200 includes many of the same components as shown in FIG. 1, and these components may operate in a substantially similar manner with exceptions that will now be described.

In the approach represented by system 200, a user interacts with cloud services management server 145 via cloud services management console 155 to cause a virtual machine 210 to be launched on host computer 205. However, instead of retrieving OS image 120 during boot-up in the manner of host computer 105 of system 100, host computer 205 pre-fetches a copy of OS image 120 prior to boot-up and caches such pre-fetched OS image 220 in local storage 215 (e.g., a hard drive or other memory) of host computer 205. Host computer 205 then boots virtual machine 210 from pre-fetched OS image 220. This allows the boot-up process to be much faster than if OS image 120 were fetched from remote storage system 125 during boot-up. However, in this approach, the pre-fetching of OS image 120 still adds a delay (e.g., and in some cases a considerable delay) between when a user requests that virtual machine 210 be launched and when virtual machine 210 is actually launched.

To address this issue, embodiments described herein enable a host computer to pre-fetch only those portions of an OS image required for booting up a virtual machine. This approach is based on an observation that only a portion of the OS image may be required to launch the virtual machine. For example, for some Microsoft® Windows® operating systems, approximately 1 GB of an OS image of approximately 15 GB or more is required for boot up while for some Linux operating systems, approximately 55 MB of an OS image of approximately 2 GB or more is required. Since only a portion of the OS image needs to be pre-fetched, the amount of time required to launch the virtual machine may be reduced (e.g., greatly reduced) relative to an approach in which the entire OS image is pre-fetched. This approach will now be described in reference to FIG. 3.

Figure 3:
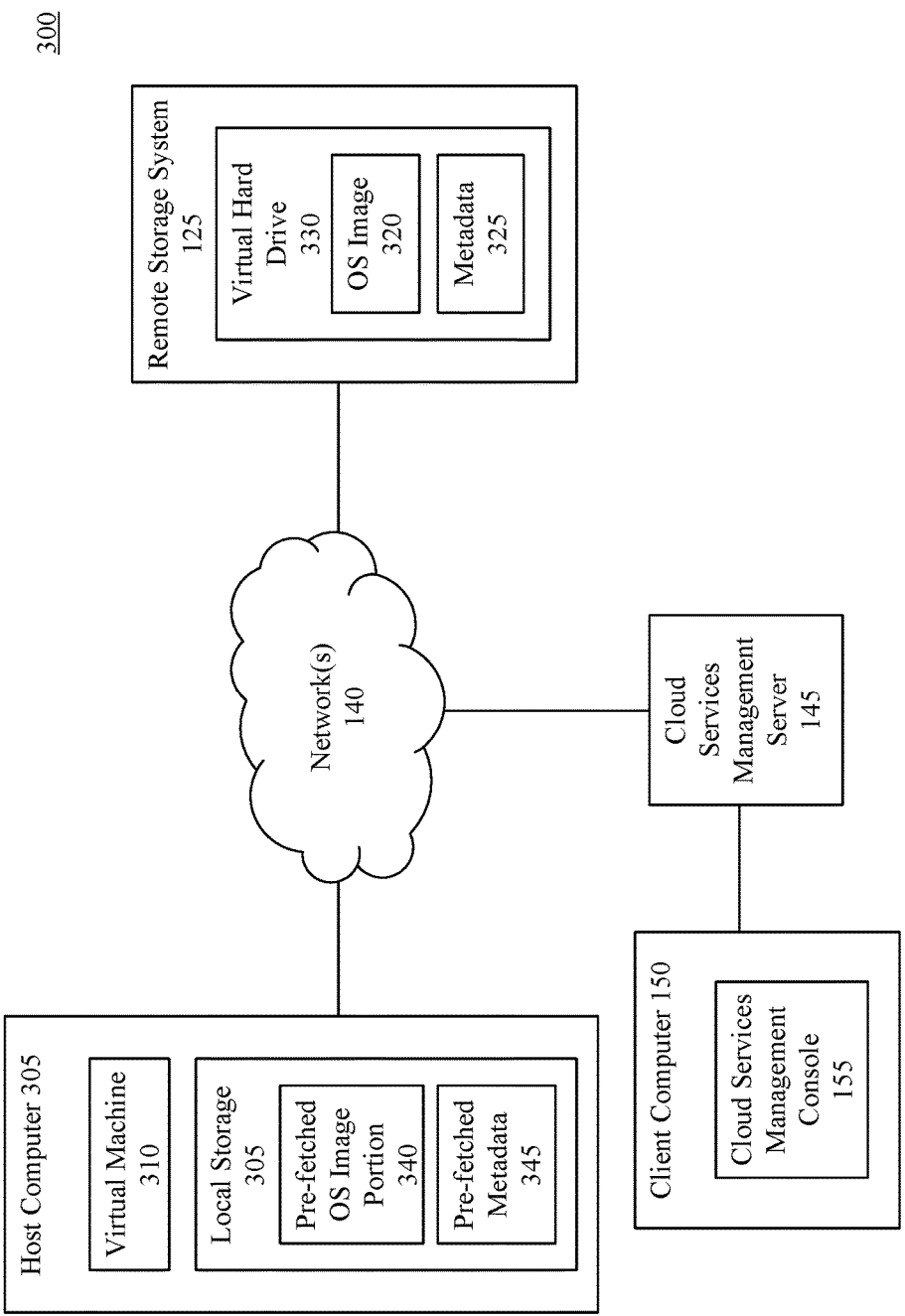
FIG. 3 is a block diagram of another example system for booting up an OS of a virtual machine on a host computer in a cloud environment in which an image of the OS is stored remotely from the host computer, in accordance with an embodiment.

In particular, FIG. 3 is a block diagram of another example system 300 for booting up an OS of a virtual machine on a host computer in a cloud environment in which an image of the OS is stored remotely from the host computer, in accordance with an embodiment. As shown in FIG. 3, system 300 includes some of the same components as shown in FIGS. 1 and 2, and these components may operate in a substantially similar manner with exceptions that will now be described As shown in FIG. 3, an OS image 320 is stored on a virtual hard drive 330 that is maintained by remote storage system 125. As will be understood by persons skilled in the relevant art(s), the term "virtual hard drive" refers to a file or set of files that appears as a physical disk drive to an operating system, wherein the files can be on the host computer or on a remote computer. In this case, virtual hard drive 330 is stored on one or more physical disks within remote storage system 125. However, it is noted that the techniques described herein for facilitating faster booting/provisioning of a virtual machine are not limited to virtual hard drives, and virtual hard drive 330 may be replaced by a physical hard drive while still maintaining the features and benefits described below with respect to system 300 of FIG. 3.

In system 300, virtual hard drive 330 includes an OS image 320, which is analogous to OS image 120 of FIG. 1. However, virtual hard drive 330 also includes metadata 325. Metadata 325 comprises information that identifies which logical units (e.g., blocks) of virtual hard drive 330 must be accessed to obtain the portion of OS image 320 required for booting up a virtual machine. In one embodiment, metadata 325 is stored as part of a footer of virtual hard drive 330, although this is an example only and is not intended to be limiting. Various ways in which metadata 325 may be generated for OS image 320 and embedded within or stored in association with virtual hard drive 330 will be described in detail below with respect to FIGS. 4-9, and thus that process will not be described here for the sake of brevity.

In further accordance with the example of FIG. 3, a user interacts with cloud services management server 145 via cloud services management console 155 to cause a virtual machine 310 to be launched on host computer 305. As part of launching virtual machine 310, host computer 305 first pre-fetches a copy of metadata 325 from remote storage system 125 via network(s) 140 and stores it in local storage 305 thereof as pre-fetched metadata 345. Host computer 305 then uses pre-fetched metadata 345 to determine which logical units of virtual hard drive 330 it needs to pre-fetch from OS image 320 on virtual hard drive 330 to boot up virtual machine 310. Host computer 305 then pre-fetches data from only the required logical units, and caches such data in local storage as pre-fetched OS image portion 340. Host computer 305 then boots virtual machine 310 from pre-fetched OS image portion 340. This approach reduces the overall time required to launch virtual machine 310 as compared to the approach described with respect to FIG. 2, in which the entire OS image is pre-fetched and cached by the host computer.

Thus, in accordance with an embodiment, a virtual machine may be booted up in a cloud environment by pre-fetching only those portions of an OS image needed for boot from a remote storage upon which the entire OS image is stored. This approach provides the resilience and persistence described above by maintaining the authoritative image of the OS in a location that is remote with respect to the host computer upon which the virtual machine is running. However, this approach also provides for relatively fast virtual machine launch times because only the portions of the OS image required for boot up need be transmitted to the host computer from the remote storage prior to boot up.

A system will now be described that can facilitate the selective pre-fetching approach of FIG. 3 for any OS that can be used to launch a virtual machine, whether standard or customized, where the virtual machine is launched from an image of the OS that is stored remotely from the host computer upon which the virtual machine is executed. Such a system may be used, for example, to generate virtual hard drive 330 shown in FIG. 3, which includes both OS image 320 and metadata 325 that identifies which logical units of OS image 320 must be pre-fetched to support booting up of a virtual machine based on OS image 320.

Figure 4:
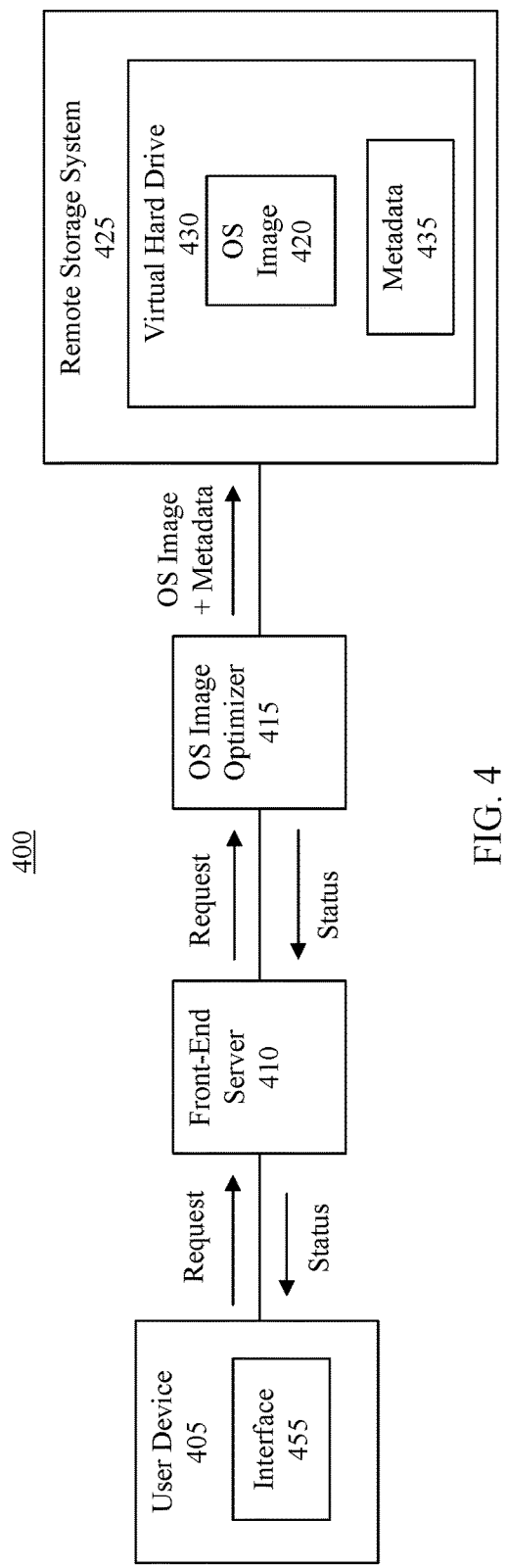
FIG. 4 is a block diagram of an example system for optimizing an OS image for faster booting/provisioning of a virtual machine, in accordance with an embodiment.

For example, FIG. 4 depicts a block diagram of a system 400 for optimizing an OS image for faster booting/provisioning of a virtual machine, in accordance with an embodiment. As shown in FIG. 4, system 400 includes a user device 405 that interfaces with an OS image optimizer 415 via a front-end server 410. In an embodiment, user device 405 comprises a first computing device, front-end server 410 comprises software executing on a second computing device, and OS image optimizer 415 comprises software executing on a third computing device. As will be appreciated by persons skilled in the art, the connections between such computing devices may comprise one or more peer-to-peer or network connections, one or more wired or wireless connections, or the like. In an alternate embodiment, some or all of the functions described below in reference to user device 405, front-end server 410 and OS image optimizer 415 may be combined into a single computing device.

As shown in FIG. 4, user device 405 is configured to provide an interface 455 that enables software executing on user device 405 or a user thereof to interact with front-end server 410 to cause an OS image to be optimized to facilitate a pre-fetch operation such as was described above in reference to FIG. 3. The interface may be any type of interface such as an application program interface (API) or a user interface (UI) (e.g., a command line interface, a graphical user interface (GUI), or the like). Interface 405 may be made available, for example, to customers of a cloud service provider, personnel of a cloud service provider, and/or various other entities that may wish to publish OS images that are optimized for pre-fetch. The OS image to be optimized may be a standard or customized OS image and may be of any OS type and/or any OS version.

In further accordance with this example, software executing on user device 405 (in a case in which interface 455 is an API) or a user of user device 405 (in a case in which interface 455 is a UI) submits a request to front-end server 410 via interface 455. In one embodiment, the request comprises a request to optimize an OS image. In an alternate embodiment, the request comprises a request to publish an OS image to a repository (in which case the optimization process is carried out as part of the publication process). In any case, the request identifies the OS image to be optimized and also includes additional information indicative of when a boot-up process of the particular OS is deemed complete. For example, this additional information may indicate how many boot cycles of the OS must be carried out before a boot-up process of the particular OS is deemed complete. In some implementations, a "boot complete" stage is reached when a user could log onto a virtual machine running the OS. In an embodiment, the information that is indicative of when the boot-up process of the particular OS is complete is an identifier of the type and/or version of the OS, although this example is not intended to be limiting.

In an embodiment, front-end server 410 is configured to determine if a user associated with the request is authorized to submit it. For example, front-end server 410 may be configured to determine if a user associated with the request has provided valid login information and/or credentials. If front-end server 410 determines that the user is authorized to submit the request, then front-end server 410 will transmit the request to OS image optimizer 415. However, if front-end server 410 determines that the user is not authorized to submit the request, then front-end server 410 will not transmit the request to OS image optimizer 415. In an alternate embodiment, front-end server 410 may not be configured to perform such a user authorization process, and may instead simply pass the request received via interface 455 to OS image optimizer 415. In a still further embodiment, interface 455 may be configured to perform a user authorization process instead of or in addition to front-end server 410.

In further accordance with this example, OS image optimizer 415 is configured to perform an optimization process, discussed in detail below, to generate a virtual hard drive 430 that includes both an image of the OS identified in the request (shown in FIG. 4 as OS image 420) and metadata 435. Metadata 435 is information that identifies which logical units of OS image 420 must be pre-fetched to support booting up of a virtual machine based on OS image 420. As shown in FIG. 4, virtual hard drive 430 may be stored in a remote storage system 425 such that a virtual machine can be launched therefrom (e.g., in the manner described above in reference to FIG. 3 with respect to remote storage system 125, which is analogous to remote storage system 425). Since OS image 420 and metadata 435 are stored in virtual hard drive 430, a virtual machine launched therefrom will be launched with a high resilience and persistence.

The optimization process performed by OS image optimizer 415 will now be described. In an embodiment, OS image optimizer 415 performs the optimization process in response to receiving the aforementioned request. To begin the optimization process, OS image optimizer 415 obtains a copy of the OS image to be optimized (i.e., the OS image identified in the request). For example, OS image optimizer 415 may obtain a copy of a virtual hard drive that includes the OS image to be optimized from a storage device, system or location associated with a customer account, although this is merely an example and the copy of the OS image may be obtained from a variety of other storage mediums in a variety of other ways.

After OS image optimizer 415 has obtained a copy of the OS image to be optimized, OS image optimizer 415 performs a boot-up process of the OS image to be optimized. OS image optimizer 415 may do this by launching a virtual machine based on a copy of a virtual hard drive that includes the OS image. During the boot-up process, OS image optimizer 415 observes and records data access patterns that identify logical units in the virtual hard drive that are accessed to obtain the portion of OS image necessary for boot-up. In one embodiment, the functionality of OS image optimizer 415 that launches the virtual machine and observes and records the data access patterns is itself performed by a virtual machine. In other words, the OS image to be optimized is booted up on a first virtual machine and the data access patterns are obtained by a second virtual machine within which the first virtual machine is executing. The increased isolation provided by this configuration advantageously allows for improved security when dealing with untrusted third-party OS images.

OS image optimizer 415 continues the boot-up process until it is complete. OS image optimizer 415 determines that the boot-up process is complete based on the additional information in the request. For example, in an embodiment in which the additional information includes a type and/or version of the OS, OS image optimizer 415 may map such additional information to a number of boot cycles that must be carried out until boot-up is deemed complete, where different OS types and versions may have different numbers of boot cycles. In further accordance with such an embodiment, OS image optimizer 415 will execute the requisite number of boot cycles before concluding its observing and recording of data access patterns.

Upon completion of the boot-up process, OS image optimizer 415 converts the data access patterns observed during the boot-up process into metadata 435. OS image optimizer 415 then creates a copy of the virtual hard drive that includes the OS image (shown in FIG. 4 as OS image 420) and metadata 435 and stores the copy of the virtual hard drive in remote storage system 425. This modified copy of the virtual hard drive is shown in FIG. 4 as virtual hard drive 430. In one embodiment, OS image optimizer stores metadata 435 in a footer of virtual hard driver 430, although this is only an example, and metadata 435 may be stored in association with OS image 420 in a variety of different ways as will be appreciated by persons skilled in the relevant art(s). In this way, OS image 420 and metadata 435 can later be used to launch a virtual machine in the manner discussed above in reference to FIG. 3. In some embodiments, multiple copies of virtual hard drive 430 are stored to multiple different storage locations to increase availability and persistence.

In one embodiment, prior to performing the optimization process, OS image optimizer 415 may determine if the OS image to be optimized is new or has already been optimized and stored in the system. If the OS image to be optimized is new, then OS image optimizer 415 will perform the optimization process on it. If the OS image to be optimized has already been optimized and is stored in the system, then OS image optimizer 415 may not perform the optimization process and instead transmit an alert to interface 455 that the OS image has already been optimized and that the optimization process will not be performed.

As shown in FIG. 4, at any time during the workflow of system 400, user device 405 can make a status query to OS image optimizer 415 via front-end server 410. In response to receiving the status query, OS image optimizer 415 will determine the status of the optimization process, and transmit the status back to user device 405 via front-end server 410. The status of the optimization process can be conveyed to a software entity or user via interface 455.

In a further embodiment, once the optimization process is complete, OS image optimizer 415 determines the success or failure of the optimization process. If the boot sequence cannot be captured, the optimization process failed. In such a case, OS image optimizer 415 may still publish the OS image such that it can be used to launch virtual machines—however, OS image optimizer 415 may not include any metadata in the published version of the virtual hard drive. In this case, a virtual machine can still be booted from the OS image, it will just boot at a slower pace. However, if the boot sequence was captured, then the optimization process was a success. In the event of a success, virtual hard drive 430 that includes OS image 420 and metadata 435 is published to remote storage system 425 as discussed above. In an embodiment, system 400 may replicate virtual hard drive 430 to numerous different remote storage systems, so that the optimized OS image may be accessed in a variety of different geographic regions.

Figure 5:
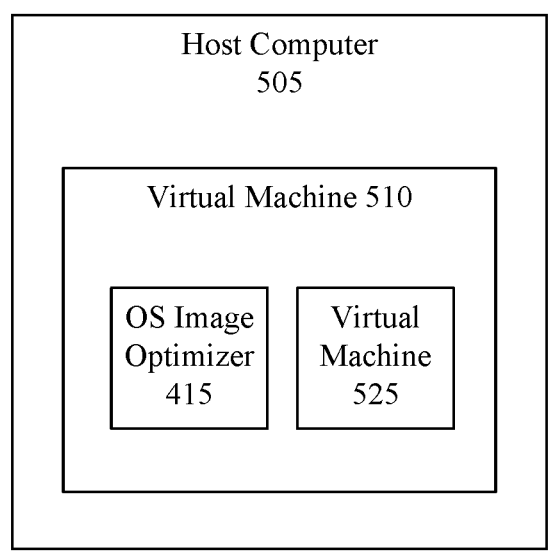
FIG. 5 is a block diagram of an example implementation of an OS image optimizer, in accordance with an embodiment.

FIG. 5 is a block diagram of one example implementation of OS image optimizer 415. In the embodiment shown in FIG. 5, OS image optimizer 415 is executed by a virtual machine 510 that is hosted on a host computer 505. During execution, OS image optimizer 415 performs the above-described optimization process by launching a virtual machine 525 from an OS image and observing and recording data access patterns while doing so. As shown in FIG. 5, virtual machine 525 that is launched by OS image optimizer is executed by virtual machine 510. As noted above, the increased isolation provided by this configuration advantageously allows for improved security when dealing with untrusted third-party OS images.

Figure 6:
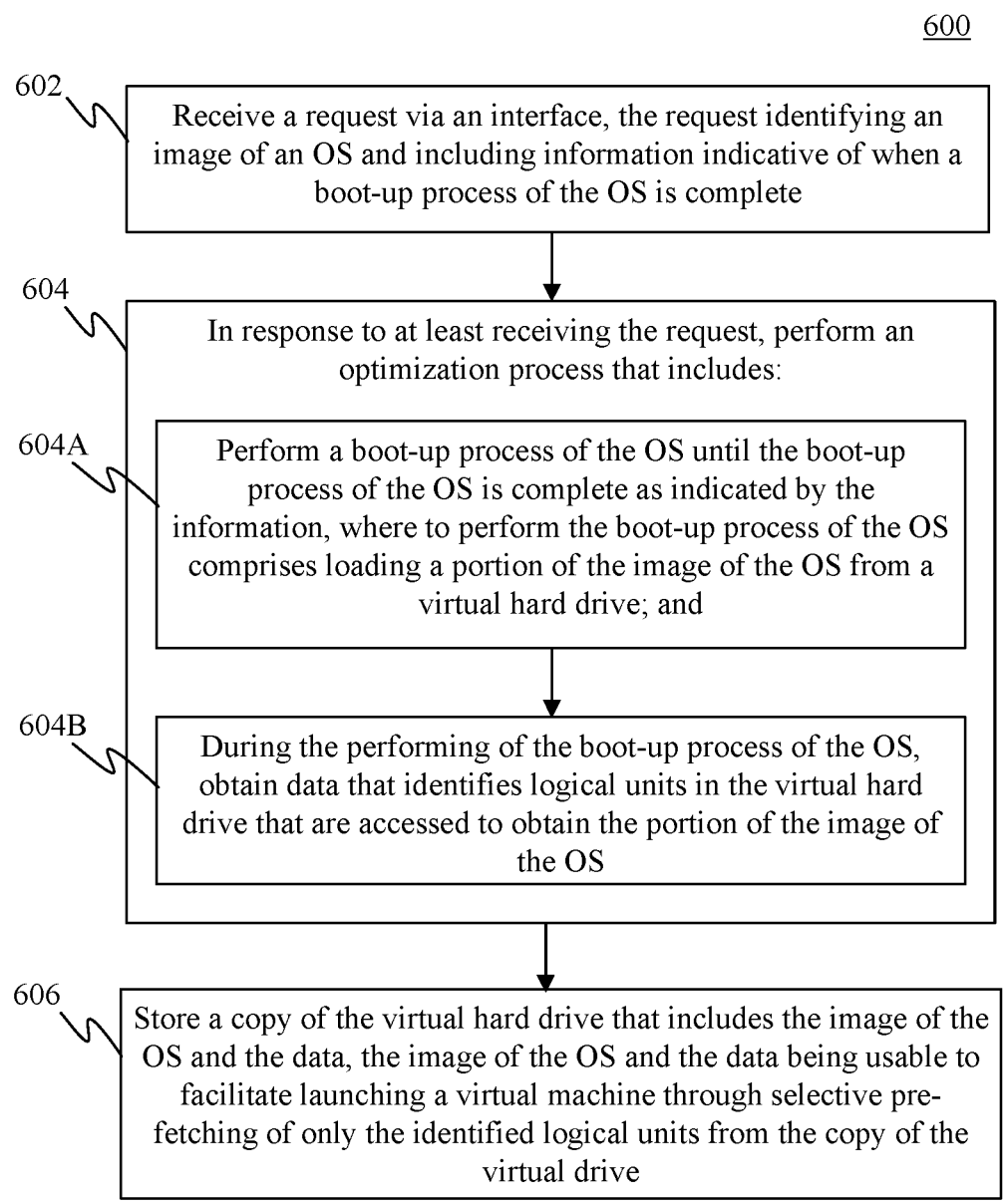
FIG. 6 shows a flowchart of a method for optimizing an OS image for faster booting/provisioning of a virtual machine, in accordance with an example embodiment.

FIG. 6 depicts a flowchart 600 of a method for optimizing an OS image for faster booting/provisioning of a virtual machine, in accordance with an example embodiment. The method of flowchart 600 may be performed, for example, by system 400 as described above in reference to FIG. 4. However, the method is not limited to that embodiment and persons skilled in the art will understand the method of flowchart 600 could be implemented by other systems or components.

As shown in FIG. 6, the method of flowchart 600 begins at step 602 in which a request is received via an interface, the request identifying an image of an OS and including information indicative of when a boot-up process of the OS is complete. For example, and with continued reference to FIG. 4, front-end server 410 may receive a request via interface 455, where the request identifies an OS image and includes information indicative of when a boot-up process of the operating system is complete. In one example, interface 455 is an application programming interface, although interface 455 could be any other type of interface including a user interface.

At step 604, in response to at least receiving the request, an optimization process is performed, which includes steps 604A, and 604B. For example, and with continued reference to FIG. 4, OS image optimizer 415 performs the optimization process in response to receiving the request. At step 604A, a boot-up process of the OS is performed until the boot-up process of the OS is complete as indicated by the information, where to perform the boot-up process of the OS comprises loading a portion of the image of the OS from a virtual hard drive. For example, OS image optimizer 415 obtains a copy of the OS image to be optimized and performs a boot-up process of the OS image to be optimized by loading a portion of the image of the OS from a virtual hard drive. As an example, OS image optimizer 415 knows when the boot-up process is complete as indicated by the information in the request. In an embodiment, the operating system is booted-up on a first virtual machine. At step 604B, during the performing of the boot-up process of the OS, data is obtained that identifies logical units in the virtual hard drive that are accessed to obtain the portion of the image of the OS. For example, during the boot-up process, OS image optimizer 415 observes and records data access patterns that identify logical units in the virtual hard drive that are accessed to obtain the portion of the OS image necessary for boot-up. In an embodiment, the data is obtained by a second virtual machine within which the first virtual machine is executing.

At step 606, a copy of the virtual hard drive that includes the image of the OS and the data is stored, the image of the OS and the data being usable to facilitate launching a virtual machine through selective pre-fetching of only the identified logical units from the copy of the virtual hard drive. For example, and with continued reference to FIG. 4, virtual hard drive 430 is generated including OS image 420 and metadata 435 and stored in remote storage system 425. In a further example, OS image 420 and metadata 435 can be used to facilitate launching a virtual machine therefrom. In an embodiment, OS image optimizer 415 may determine a status of the optimization process and transmit the status to user device 405 via front-end server 410.

Figure 7:
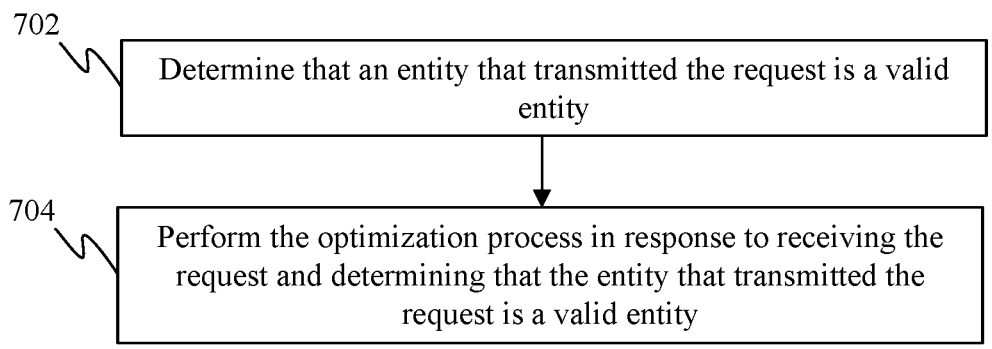
FIG. 7 shows a flowchart of additional steps that may be performed in conjunction with the method described in reference to FIG. 6, in accordance with an example embodiment.

FIG. 7 depicts a flowchart 700 of additional steps that may be performed in conjunction with the method described above in reference to FIG. 6, in accordance with an example embodiment. These steps may be performed, for example, as part of step 604.

At step 702, it is determined that an entity that transmitted the request is a valid entity. For example, and with continued reference to FIG. 4, front-end server 410 determines if a user associated with the request is authorized to submit it. Furthermore, interface 455 may perform a user authorization process instead of or in addition to front-end server 410.

At step 704, in response to determining that the entity that transmitted the request is a valid entity, the optimization process is performed. For example, in one embodiment, if front-end server 410 determines that the user is authorized to submit the request, then front-end server 410 will transmit the request to OS image optimizer 415. However, if front-end server 410 determines that the user is not authorized to submit the request, then front-end server 410 will not transmit the request to OS image optimizer 415.

Figure 8:
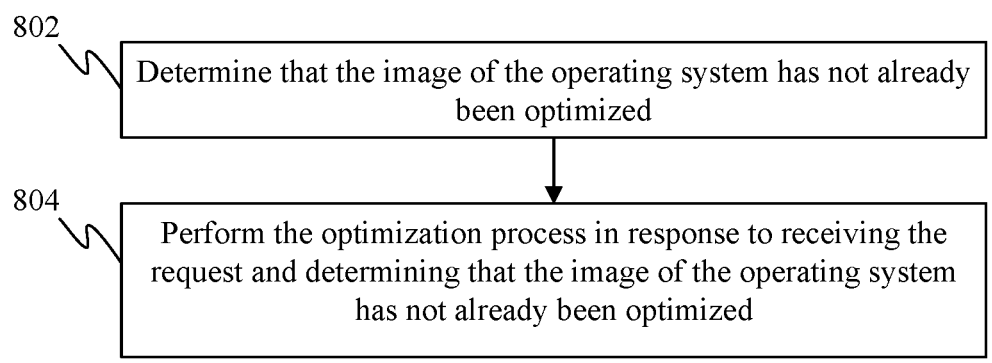
FIG. 8 shows a flowchart of additional steps that may be performed in conjunction with the method described in reference to FIG. 6, in accordance with an example embodiment.

FIG. 8 depicts a flowchart 800 of other additional steps that may be performed in conjunction with the method described above in reference to FIG. 6, in accordance with an example embodiment. These steps may be performed, for example, as part of step 604.

At step 802, it is determined that the image of the operating system has not already been optimized. For example and with continued reference to FIG. 4, OS image optimizer 415 determines if the OS image to be optimized is new or has already been optimized and stored in the system.

At step 804, in response to receiving the request and determining that the image of the operating system has not already been optimized, the optimization process is performed. For example, if the OS image to be optimized is determined to be new, then OS image optimizer 415 will perform the optimization process on it.

III. Example Mobile and Stationary Device Embodiments

The aforementioned systems (e.g., the systems shown in FIGS. 4 and 5) and methods (e.g., the methods shown in FIGS. 6-8) may be implemented in hardware, or hardware combined with software and/or firmware. For example, user device 405, interface 455, front-end server 410, OS image optimizer 415, and remote storage system 425 of system 400 and the methods of the flowcharts shown in FIGS. 6-8 may each be implemented as computer program code/instructions configured to be executed in one or more processors and stored in a computer readable storage medium. Alternatively, these components of system 400 and methods may be implemented as hardware logic/electrical circuitry.

Figure 9:
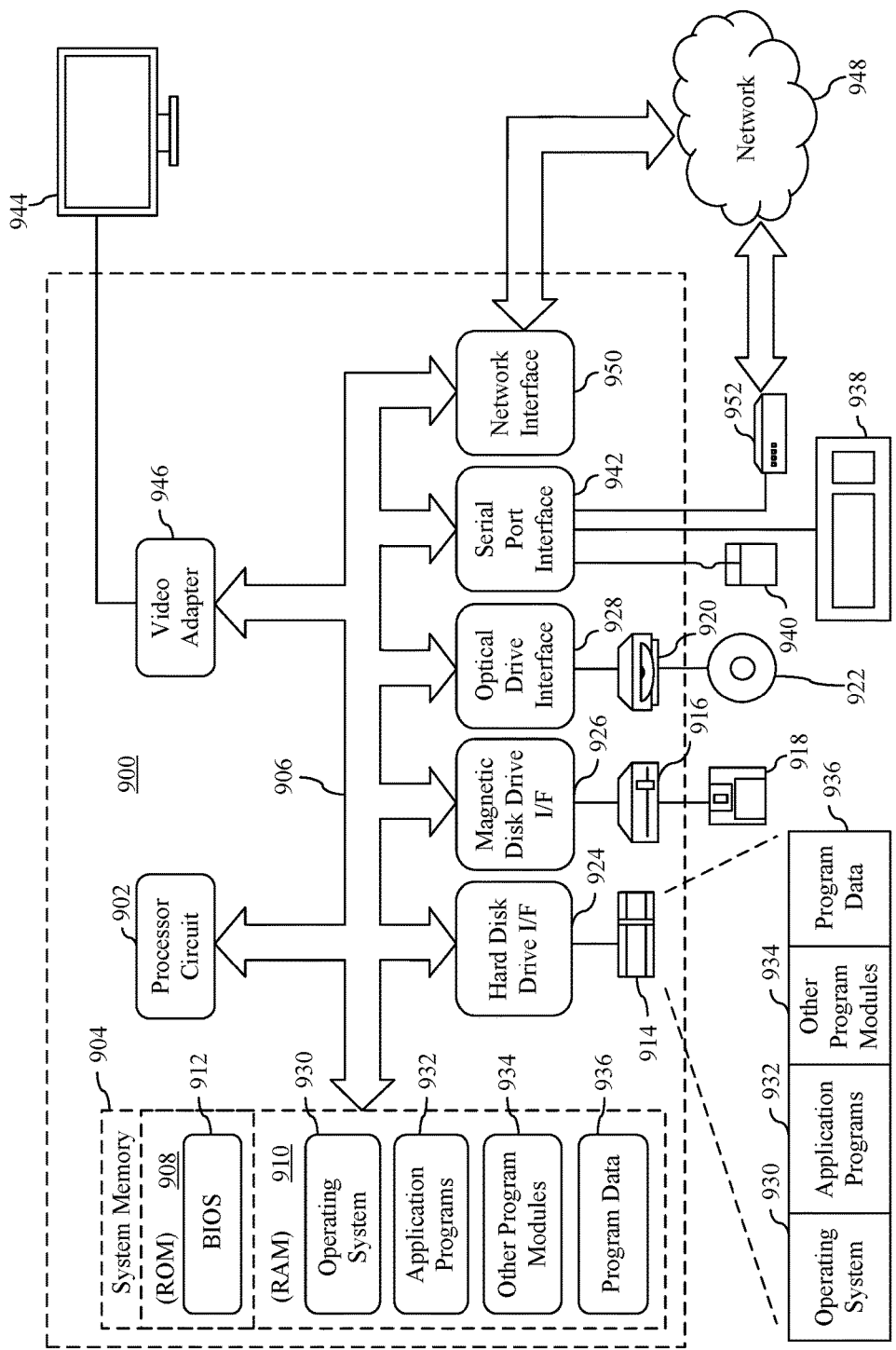
FIG. 9 shows a block diagram of an example computing device that may be used to implement various embodiments.

FIG. 9 depicts a block diagram of an example computing device 900 that may be used to implement various embodiments. For example, one or more of user device 405, interface 455, front-end server 410, OS image optimizer 415, and remote storage system 425 of system 400 may be implemented in one or more computing devices similar to computing device 900 in stationary or mobile computer embodiments, including one or more features of user device 405, interface 455, front-end server 410, OS image optimizer 415, and remote storage system 425 of system 400 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media. A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the systems described in reference to FIGS. 4 and 5, and the methods described in reference to FIGS. 6-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method for facilitating a pre-fetch operation used to launch a virtual machine is described herein. The method includes receiving a request via an interface, the request identifying an image of an operating system and including information indicative of when a boot-up process of the operating system is complete; in response to at least receiving the request, performing an optimization process that includes: performing a boot-up process of the operating system until the boot-up process of the operating system is complete as indicated by the information, performing the boot-up process of the operating system comprising loading a portion of the image of the operating system from a virtual hard drive; and during the performing of the boot-up process of the operating system, obtaining data that identifies logical units in the virtual hard drive that are accessed to obtain the portion of the image of the operating system; and storing a copy of the virtual hard drive that includes the image of the operating system and the data, the image of the operating system and the data being usable to facilitate launching a virtual machine through selective pre-fetching of only the identified logical units from the copy of the virtual hard drive.

In one embodiment of the foregoing method, receiving the request via the interface comprises receiving the request via an application programming interface.

In another embodiment of the foregoing method, the performing the boot-up process of the operating system includes booting up the operating system on a first virtual machine.

In yet another embodiment of the foregoing method, the obtaining step is performed by a second virtual machine within which the first virtual machine is executing.

In still another embodiment of the foregoing method, the method further comprises transmitting a status of the optimization process in response to receiving a request for status.

In still another embodiment of the foregoing method, the method further comprises determining that an entity that transmitted the request is a valid entity; and performing the optimization process in response to receiving the request and determining that the entity that transmitted the request is a valid entity.

In still another embodiment of the foregoing method, the method further comprises determining that the image of the operating system has not already been optimized; and performing the optimization process in response to receiving the request and determining that the image of the operating system has not already been optimized.

A system for facilitating a pre-fetch operation used to launch a virtual machine is also described herein. The system includes a front-end server, an operating system image optimizer, and a remote storage system. The front-end server is configured to receive a request via an interface, the request identifying an image of an operating system and including information indicative of when a boot-up process of the operating system is complete. The operating system image optimizer is configured to receive the request from the front-end server and in response to receiving the request from the front-end server, perform an optimization process. The optimization process includes performing a boot-up process of the operating system until the boot-up process of the operating system is complete as indicated by the information, performing the boot-up process of the operating system comprising loading a portion of the image of the operating system from a virtual hard drive, and during the performing of the boot-up process of the operating system, obtaining data that identifies logical units in the virtual hard drive that are accessed to obtain the portion of the image of the operating system. The remote storage system is configured to store a copy of the virtual hard drive that includes the image of the operating system and the data, the image of the operating system and the data being usable to facilitate launching a virtual machine through selective pre-fetching of only the identified logical units from the copy of the virtual hard drive.

In one embodiment of the foregoing system, the interface is an application programming interface.

In another embodiment of the foregoing system, the operating system image optimizer is configured to perform the boot-up process of the operating system by booting up the operating system on a first virtual machine.

In yet another embodiment of the foregoing system, the operating system image optimizer is executed on a second virtual machine within which the first virtual machine is executing.

In still another embodiment of the foregoing system, the operating system image optimizer is further configured to transmit a status of the optimization process in response to receiving a request for status.

In still another embodiment of the foregoing system, the front-end server is further configured to determine if an entity that transmitted the request is a valid entity and in response to determining that an entity is a validated entity, transmit the request to the operating system image optimizer.

A computer program product is also described herein. The computer program product comprises a computer-readable memory having computer program logic recorded thereon that when executed by at least one processor causes the at least one processor to perform a method, the method comprising: receiving a request via an interface, the request identifying an image of an operating system and including information indicative of when a boot-up process of the operating system is complete; in response to at least receiving the request, performing a process that includes: performing a boot-up process of the operating system until the boot-up process of the operating system is complete as indicated by the information, performing the boot-up process of the operating system comprising loading a portion of the image of the operating system from a virtual hard drive; and during the performing of the boot-up process of the operating system, obtaining data that identifies logical units in the virtual hard drive that are accessed to obtain the portion of the image of the operating system; and storing a copy of the virtual hard drive that includes the image of the operating system and the data, the image of the operating system and the data being usable to facilitate launching a virtual machine through selective pre-fetching of only the identified logical units from the copy of the virtual hard drive.

In one embodiment of the foregoing computer program product, receiving the request via the interface comprises receiving the request via an application programming interface.

In another embodiment of the foregoing computer program product, performing the boot-up process of the operating system includes: booting the operating system on a first virtual machine.

In yet another embodiment of the foregoing computer program product, the obtaining step is performed by a second virtual machine within which the first virtual machine is executing.

In still another embodiment of the foregoing computer program product, the method further comprises transmitting a status of the optimization process in response to receiving a request for status.

In still another embodiment of the foregoing computer program product, the method further comprises: determining that an entity that transmitted the request is a valid entity; and performing the optimization process in response to receiving the request and determining that the entity that transmitted the request is valid.

In still another embodiment of the foregoing computer program product, the method further comprises determining that the image of the operating system has not already been optimized; and performing the optimization process in response to receiving the request and determining that the image of the operating system has not already been optimized.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for facilitating a pre-fetch operation used to launch a virtual machine, the method comprising:
receiving a request via an interface, the request identifying an image of an operating system and including information indicative of when a boot-up process of the operating system is complete;
in response to at least receiving the request, performing an optimization process that includes:
performing a boot-up process of the operating system until the boot-up process of the operating system is complete as indicated by the information, performing the boot-up process of the operating system comprising loading a portion of the image of the operating system from a virtual hard drive; and
during the performing of the boot-up process of the operating system, obtaining data that identifies logical units in the virtual hard drive that are accessed to obtain the portion of the image of the operating system; and
storing a copy of the virtual hard drive that includes the image of the operating system and the data, the image of the operating system and the data being usable to facilitate launching a virtual machine through selective pre-fetching of only the identified logical units from the copy of the virtual hard drive.

2. The method of claim 1, wherein receiving the request via the interface comprises receiving the request via an application programming interface.

3. The method of claim 1, wherein the performing the boot-up process of the operating system includes:
booting up the operating system on a first virtual machine.

4. The method of claim 3, wherein the obtaining step is performed by a second virtual machine within which the first virtual machine is executing.

5. The method of claim 1, the method further comprising transmitting a status of the optimization process in response to receiving a request for status.

6. The method of claim 1, the method further comprising:
determining that an entity that transmitted the request is a valid entity; and
performing the optimization process in response to receiving the request and determining that the entity that transmitted the request is a valid entity.

7. The method of claim 1, the method further comprising:
determining that the image of the operating system has not already been optimized; and
performing the optimization process in response to receiving the request and determining that the image of the operating system has not already been optimized.

8. A system for facilitating a pre-fetch operation used to launch a virtual machine comprising:
a front-end server configured to receive a request via an interface, the request identifying an image of an operating system and including information indicative of when a boot-up process of the operating system is complete;
one or more processor circuits configured to execute an operating system image optimizer, the operating system image optimizer configured to:
receive the request from the front-end server;
in response to receiving the request from the front-end server, perform an optimization process that includes:
performing a boot-up process of the operating system until the boot-up process of the operating system is complete as indicated by the information, performing the boot-up process of the operating system comprising loading a portion of the image of the operating system from a virtual hard drive;
during the performing of the boot-up process of the operating system, obtaining data that identifies logical units in the virtual hard drive that are accessed to obtain the portion of the image of the operating system; and
a remote storage system configured to store a copy of the virtual hard drive that includes the image of the operating system and the data, the image of the operating system and the data being usable to facilitate launching a virtual machine through selective pre-fetching of only the identified logical units from the copy of the virtual hard drive.

9. The system of claim 8, wherein the interface is an application programming interface.

10. The system of claim 8, wherein the operating system image optimizer is configured to perform the boot-up process of the operating system by booting up the operating system on a first virtual machine.

11. The system of claim 8, wherein the operating system image optimizer is executed on a second virtual machine within which the first virtual machine is executing.

12. The system of claim 8, wherein the operating system image optimizer is further configured to transmit a status of the optimization process in response to receiving a request for status.

13. The system of claim 8, wherein the front-end server is further configured to:
 determine if an entity that transmitted the request is a valid entity; and
 in response to determining that an entity is a validated entity, transmit the request to the operating system image optimizer.

14. A computer program product comprising a computer-readable memory having computer program logic recorded thereon that when executed by at least one processor causes the at least one processor to perform a method for facilitating a pre-fetch operation used to launch a virtual machine, the computer program logic comprising:
 first computer program logic configured to receive a request via an interface, the request identifying an image of an operating system and including information indicative of when a boot-up process of the operating system is complete;
 second computer program logic configured to perform a process in response to at least receiving the request, the process including:
 performing a boot-up process of the operating system until the boot-up process of the operating system is complete as indicated by the information, performing the boot-up process of the operating system comprising loading a portion of the image of the operating system from a virtual hard drive; and
 during the performing of the boot-up process of the operating system, obtaining data that identifies logical units in the virtual hard drive that are accessed to obtain the portion of the image of the operating system; and
 third computer program logic configured to store a copy of the virtual hard drive that includes the image of the operating system and the data, the image of the operating system and the data being usable to facilitate launching a virtual machine through selective pre-fetching of only the identified logical units from the copy of the virtual hard drive.

15. The computer program product of claim 14, wherein the first computer program logic is configured to receive the request via an application programming interface.

16. The computer program product of claim 14, wherein the performing the boot-up process of the operating system includes:
 booting the operating system on a first virtual machine.

17. The computer program product of claim 14,
 wherein the obtaining step is performed by a second virtual machine within which the first virtual machine is executing.

18. The computer program product of claim 14, wherein the computer program logic further comprises fourth computer program logic configured to transmit a status of the optimization process in response to receiving a request for status.

19. The computer program product of claim 14, wherein the computer program logic further comprises:
 fourth computer program logic configured to determine that an entity that transmitted the request is a valid entity; and
 fifth computer program logic configured to perform the optimization process in response to receiving the request and determining that the entity that transmitted the request is valid.

20. The computer program product of claim 14, wherein the computer program logic further comprises:
 fourth computer program logic configured to determine that the image of the operating system has not already been optimized; and
 fifth computer program logic configured to perform the optimization process in response to receiving the request and determining that the image of the operating system has not already been optimized.

* * * * *